UNITED STATES PATENT OFFICE.

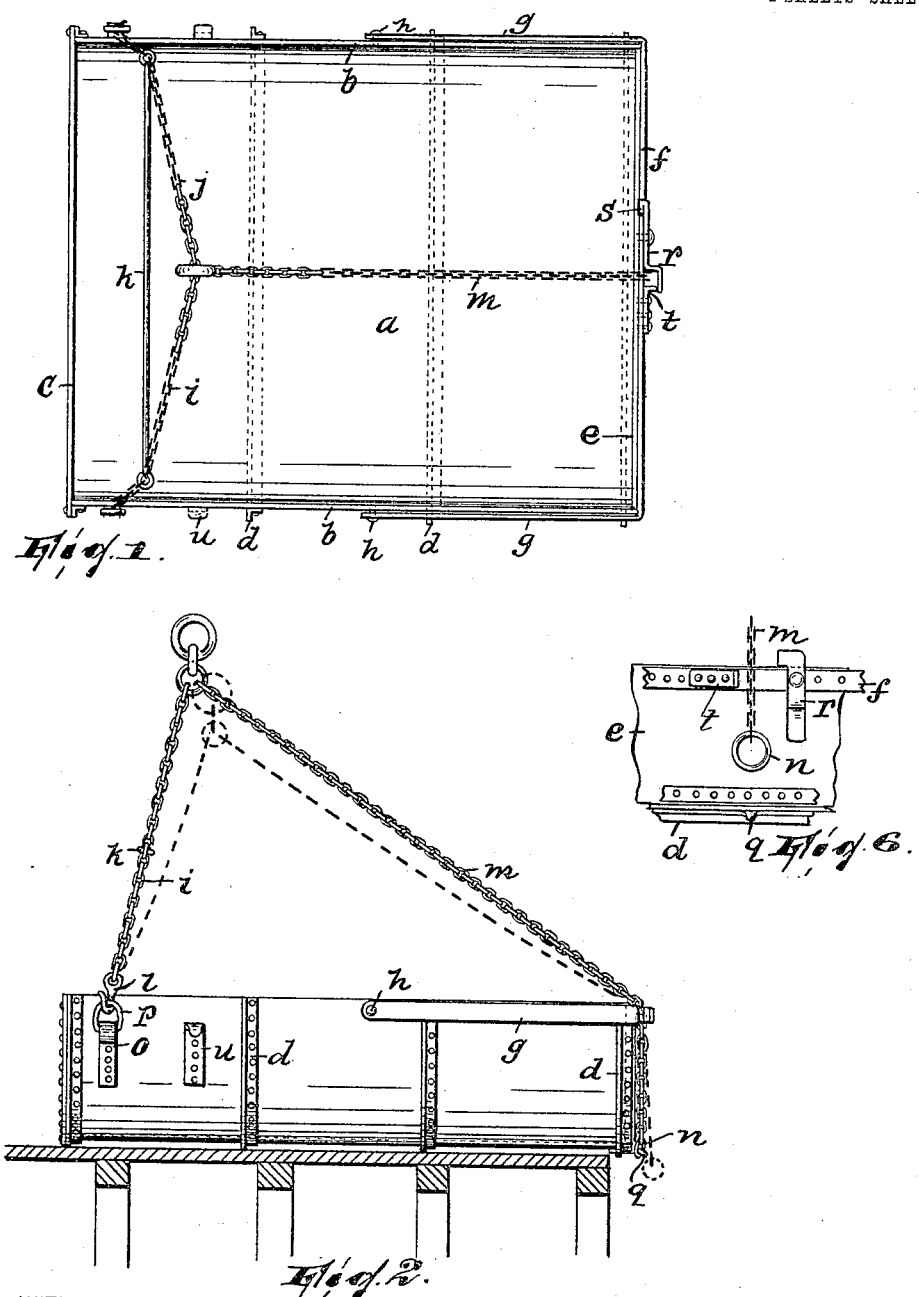

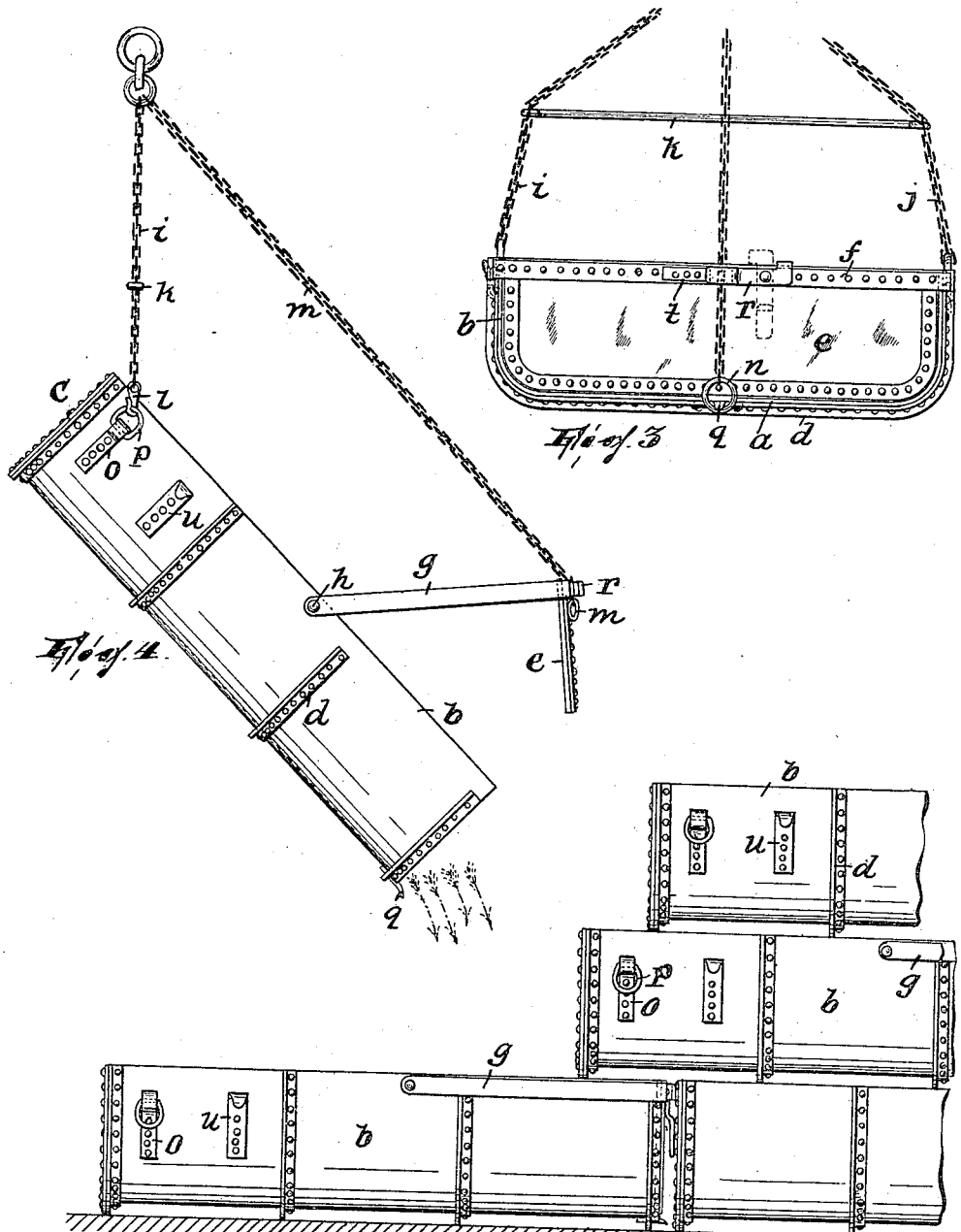

WILLIAM F. JONES, OF LITTLE FALLS, NEW JERSEY.

BUCKET OR CONVEYER.

No. 816,332.     Specification of Letters Patent.     Patented March 27, 1906.

Application filed October 2, 1905. Serial No. 280,996.

*To all whom it may concern:*

Be it known that I, WILLIAM F. JONES, a citizen of the United States, residing in Little Falls, Passaic county, State of New Jersey, have invented certain new and useful Improvements in Buckets or Conveyers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to that class of apparatus for use in moving excavated material and the like from place to place in which the receptacle part is variously known as a "skip" and "scale-box," being a vessel from which the discharge is effected at one side upon tilting the vessel.

One object of the invention is to so construct the apparatus that when the vessel is lowered, loaded, to the surface where it is to be relieved of its contents the tackle can be made to release the vessel adjacent the point of discharge while retaining its hold on the vessel at another point, and on the consequent lowering of the discharge part of the vessel the tackle will effect the opening of the door or other closure at the discharge-opening. I preferably, though not necessarily, accomplish this object by forming the tackle with branches, one of which is engaged with the closure of the vessel and may be connected with the vessel itself near its discharge-opening, so as to coact in supporting it, the connection being such that when the vessel is lowered by the hoisting apparatus onto a surface and the tackle slackened such connection will break and upon the reraising of the vessel the latter will be caused to tilt and its door to open.

Still another object of the invention is to provide for the tackle and vessel automatically clearing or disengaging each other when the vessel is to be loaded with others onto a car, barge, or the like to be conveyed to a distant place for filling or emptying.

Other objects will appear in the following description of the preferred form of my invention shown in the drawings, in which—

Figure 1 is a plan view of the apparatus. Fig. 2 is a side view showing the vessel resting on a surface unsupported by its tackle and in dotted lines the position the tackle assumes in order that on rehoisting the vessel will tilt and its closure open. Fig. 3 is a front view of the apparatus. Fig. 4 shows the apparatus in the discharging position. Fig. 5 shows several of the vessels stacked together, and Fig. 6 is a front view of a detail.

The skip or scale-box consists of an oblong body which may comprise a sheet-metal plate bent to form a bottom $a$ and two side walls $b$ and one end wall $c$, riveted together. The whole may be suitably braced, as by angle-iron ribs $d$, riveted at suitable intervals to the outside of the body and each extending down one side, under the bottom, and up the other side of the latter. Thus constructed and so far even as any other parts hereinafter to be described are concerned each such skip or scale-box presents no unwieldy or awkward projections, with the result that a number of them may be packed or nested in close arrangement, as on a barge, car, or the like. (See Fig. 5.)

According to the foregoing one end of the vessel is left open. This is adapted to be closed by a closure consisting of a suitably-reinforced plate $e$, which has riveted along its top edge portion a metallic strip or bar $f$, whose ends are extended and turned off in the same direction at right angles to form arms or levers $g$, which are fulcrumed on pivots $h$ on the sides of the vessel. The weight of the closure of course keeps it in the closed position.

So much of the tackle as need be described herein comprises three branches in the adaptation shown. Two of these, $i$ and $j$, are spaced by a spreader $k$ and carry hooks $l$ at their lower ends, while the third, $m$, may carry a ring or eye $n$.

To the sides of the vessel adjacent the end wall $c$ are riveted brackets $o$, in which are pivoted rings or eyes $p$. At the middle of the bottom of the vessel at its discharge end is a projecting hook or lug $q$, bent slightly downwardly.

To the top portion of the outer face of the closure is pivoted a latch $r$, the body of which lies flat against the closure and has a lug $s$ overhanging the top edge of the latter and adapted to limit the latch against movement past the horizontal position. The other end of the latch is angular, and when the latch is in the horizontal (operative) position said angular portion coöperates with a lug $t$, riveted to the closure to form a guideway for the branch *m* of the tackle, as well as a stop for the ring *n*.

When the vessel is suspended by the tackle, loaded, the hooks *l* are engaged in the rings *p* and the ring *n* is engaged with the hook or lug *q*. The closure *e* is now of course closed. Should now the vessel be lowered until it rests on a surface and the tackle slightly slackened, the ring *n* will slip off the hook *q*, so that when the slack is taken up and the rehoisting begins the branches *i* and *j* of the tackle will raise the vessel, tilting it. The running engagement which the branch *m* has with the closure permits a temporary maintenance of the closure with the vessel until the ring *n* brings up against the latch, whereupon the continued tilting movement of the vessel causes the closure to open. The use of pivoted rings *p* instead of rigid ones has the advantage that thereby the tackle can slacken sufficiently to disengage ring *n* and hook *q* without the hooks *l* becoming disengaged from the rings *p*.

On the sides of the vessel adjacent the brackets *n* are riveted hooks *u*. When it is desired to automatically release the vessel bodily from the tackle, as when it is to be conveyed to some distant point, the hooks *l* are engaged with the hooks *u* and the ring *n* with the hooks *q* and the latch *r* left in the position shown in Fig. 6. Upon the vessel being lowered onto a surface and the slackening of the tackle the latter will disengage itself from the hooks *u* and *q*, and thus clear the vessel, leaving it where deposited.

Having thus fully described my invention, what I claim as new, and desire to secure by Letters Patent, is—

1. The combination of the vessel having one open side, a closure for the open side, a tackle connected with the vessel and having a branch engaged with said closure, and means for disconnectively connecting said branch with the vessel, substantially as described.

2. The combination of the vessel having one open side, a closure for the open side pivotally mounted in the vessel, a tackle connected with the vessel and having a branch engaged with said closure, and means for disconnectively connecting said branch with the vessel, substantially as described.

3. The combination of the vessel having one open side, a closure for the open side having pivotal movement in the vessel around a substantially horizontal axis, a tackle connected with the vessel and having a branch connected with said closure, and means for disconnectively connecting said branch with the vessel, substantially as described.

4. The combination of the vessel having one open side, a closure for the open side having pivotal movement in the vessel around a substantially horizontal axis, a tackle connected with the vessel and having a branch having a running engagement with said closure, and means for disconnectively connecting said branch with the vessel, substantially as described.

5. The combination of the vessel having one open side, a closure for the open side having up-and-down movement in the vessel, a tackle connected with the vessel and having a branch having a running engagement with the closure, and means for disconnectively connecting said branch with the vessel, substantially as described.

6. The combination of the vessel having one open side, rings pivoted in opposite side walls thereof, a three-branch tackle having two branches connected with said rings, and a hook and eye for connecting the third branch with the vessel, the one being carried by said third branch and the other by the vessel adjacent its open side, substantially as described.

7. The combination of the vessel having one open side, a closure for the open side having up-and-down movement in the vessel, a tackle connected with the vessel and having a branch, means for disconnectively connecting said branch with the vessel at a point adjacent the lower mid-portion of said closure, and a latch pivoted in said closure and normally overlapping said branch, substantially as described.

8. The combination of the vessel having one open side, a closure for the open side having up-and-down movement in the vessel, a tackle connected with the vessel and having a branch, a guiding device for said branch arranged on the closure, and devices, carried one by said branch and the other by the vessel, for disconnectively connecting said branch with the vessel, the one carried by said branch being engageable with said guiding device to limit the movement of said branch in the latter, substantially as described.

In testimony that I claim the foregoing I have hereunto set my hand this 29th day of September, 1905.

WILLIAM F. JONES.

Witnesses:
   JOHN W. STEWARD,
   WM. D. BELL.